Figure 3:
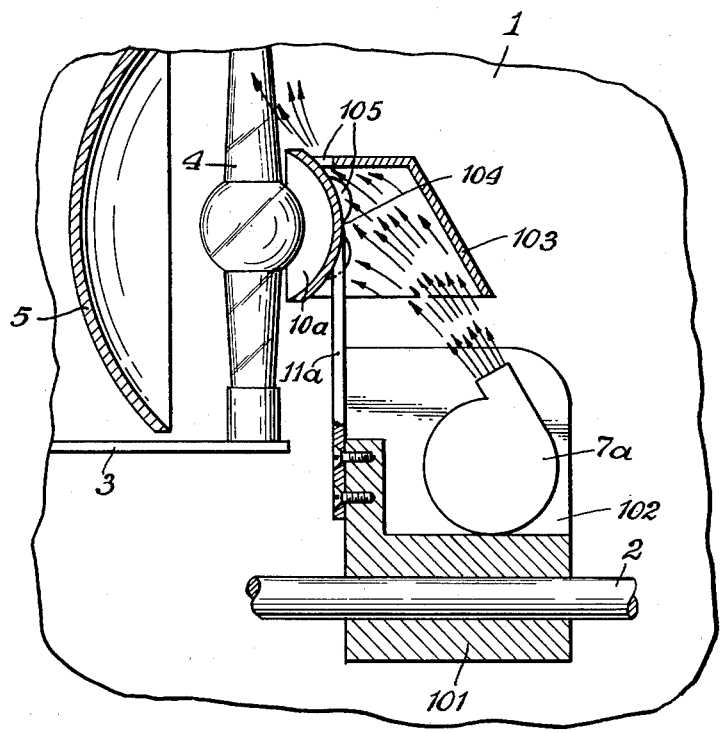

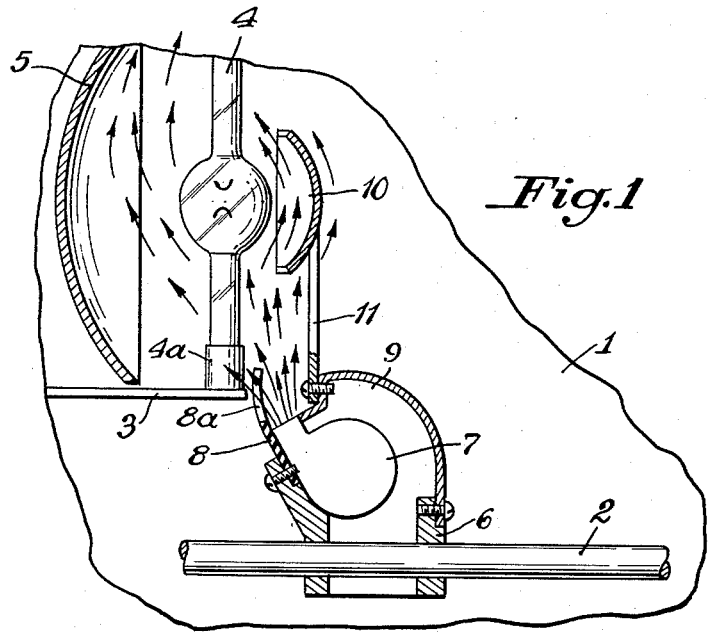
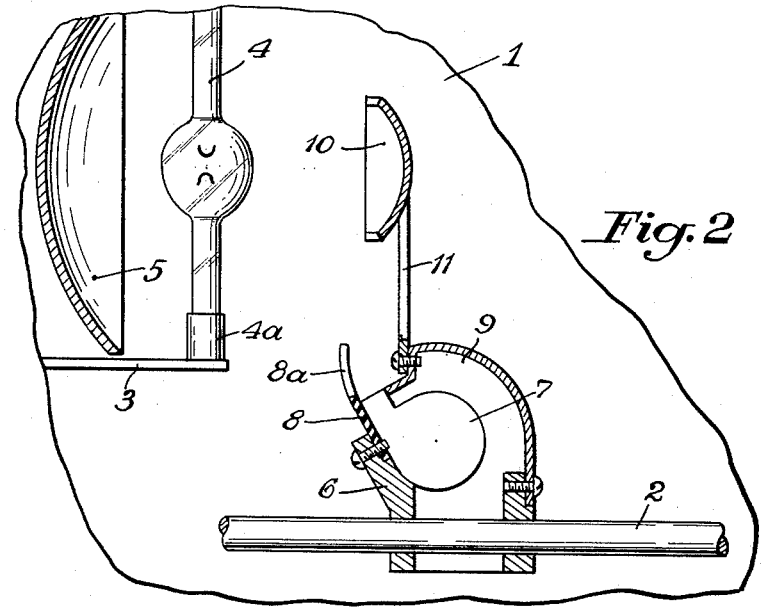

United States Patent Office 3,120,928
Patented Feb. 11, 1964

3,120,928
PROJECTION LAMP WITH AIR COOLING
Erich Götze, Kiel-Neumuhlen-Diedrichsdorf, Germany, assignor to Zeiss Ikon Aktiengesellschaft, Stuttgart, Germany
Filed Oct. 31, 1961, Ser. No. 148,968
Claims priority, application Germany Nov. 5, 1960
7 Claims. (Cl. 240—47)

This invention relates to a projection lamp with air cooling and is particularly directed to such a projection lamp which employs a high pressure gas discharge lamp as a source of light.

It is an object of the invention to provide a projection lamp with a blower which is movably mounted in the lamp housing and preferably is arranged to be movable in a direction parallel to the optical axis of the projector or the projection light beam.

Another object of the invention is to combine the movable blower with the auxiliary mirror which in customary manner is associated with the high pressure gas discharge lamp, such as a Xenon lamp, to form a unitary assembly which may be moved away from the lamp proper when it is desired to exchange the lamp.

Still another object of the invention is to provide the blower with an air guide surface which is made of a heat resistant insulating material. This air guide surface may be provided with apertures or slots suitable for an additional control of the cooling air stream which is discharged by the blower.

It is also an object of the invention to provide the rear surface of the auxiliary mirror which is associated with the gas discharge lamp with a hood which is open toward the discharge nozzle of the blower and receives the discharged air for cooling the auxiliary mirror. Preferably, this hood is provided adjacent the auxiliary mirror with recesses or apertures through which the cooling air may escape from the hood.

With these and other objects in view the invention will now be described with reference to the accompanying drawings, in which FIG. 1 illustrates a vertical sectional view of a projection lamp in its operative position in which the blower and the auxiliary mirror of the source of light form a unitary assembly;

FIG. 2 is a view similar to FIG. 1, but illustrates the blower and the auxiliary mirror assembly in an inoperative position in which it is easily possible to exchange the lamp, and FIG. 3 illustrates another embodiment of the invention in a sectional view similar to FIG. 1, in which the rear surface of the auxiliary mirror is provided with a hood for receiving the cooling air from the blower.

Referring to FIG. 1, a lamp housing 1 is provided with parallel and horizontal guide rods 2 and a holder 3 for a high pressure gas discharge lamp 4 in rear of which is mounted a large concave mirror 5. A carriage 6 is slidably adjustably mounted on the guide rods 2 and has mounted thereon a blower 7 and also an air guide member 8 in the form of a somewhat concave plate, the upper portion of which is provided with parallel slots 8a. The carriage 6 has also attached thereto a concave hood 9 in which the blower 7 is mounted. The hood 9 has attached to its upper portion an upwardly extending support 11 for holding an auxiliary mirror 10 in spaced relation from the center portion of the high pressure gas discharge lamp 4. In the operative position of the lamp 4, as shown in FIG. 1, the carriage 6 with the blower 7, the air guide plate 8, the hood 9 and the auxiliary mirror 10 thereon is moved in close proximity of the lamp 4. The blower 7, which is constructed as a tangential blower, discharges the cooling air, the intake of which is from below, in an upward direction principally into the space between the auxiliary mirror 10 and the lamp 4. In addition, a portion of the cooling air passes through the slots 8a in the guide plate 8 made of heat resistant insulating material into the space between the large concave mirror 5 and the lamp 4 in an upward direction.

FIG. 2 illustrates the inoperative position of the lamp 4 in which the carriage 6 having the parts 6, 7, 8, 9, 10 and 11 mounted thereon is moved away from the lamp 4 so that the lamp 4 may be conveniently exchanged. This movement of the carriage 6 with its associated parts away from the lamp 4 is of particular advantage because after a longer operation period the lamp 4 will be in a rather hot condition when it has to be exchanged.

The purpose of making the air guide plate 8 of an insulating material isi to prevent a sparking between the minus pole 4a of the lamp 4 and the grounded portion of the lamp housing 1 when the blower 7, the auxiliary mirror 10 and the plate 8 are in the operative position illustrated in FIG. 1.

In a projection lamp of the type described which employs a high pressure gas discharge lamp and the mentioned auxiliary mirror 10, it is well known that the auxiliary mirror on account of its position with respect to the high pressure gas discharge lamp is subjected to an increased high thermic load and in order to reduce this thermic load, the invention proposes to provide on the rear face of the auxiliary mirror 10 an additional hood which is open toward the discharge nozzle of the blower so that the rear surface of the auxiliary mirror 10 is subjected to an additional cooling effect.

Such a modified embodiment of the invention is disclosed in FIG. 3. The lamp housing 1 is again provided, as in the first described embodiment, with horizontal guide rods 2, a holder 3 for the high pressure gas discharge lamp 4, and the customary large concave mirror 5. In this embodiment the carriage 101, which is slidably mounted upon the horizontal guide rods 2, is provided with two upwardly extending parallel side walls 102 between which the blower 7a is arranged. The carriage 101 has attached thereto an upwardly extending support 11a to the upper end of which is attached the concave mirror 10a. On the rear face of this auxiliary mirror 10a is arranged a rearwardly extending hood 103 which is open toward the blower 7a and also toward the auxiliary mirror 10a. The edges 104 of the hood 103 which engage the auxiliary mirror 10a are provided with recesses which form apertures 105 for the passage of the cooling air.

The nozzle of the blower 7a directs the discharged air in such a manner and with such a speed into the hood 103 that the cooling air collects within the hood 103 and is forced through the apertures 105. In this manner a very effective air cooling of the auxiliary mirror 10a takes place, while on the other hand the blower 7a furnishes also sufficient cool air for a ventilation of the surrounding space within the lamp housing.

What I claim is:

1. In a projection lamp, a lamp housing, a high pressure gas discharge lamp mounted in said housing to provide a light source, a concave reflector mirror mounted in said housing and adjacent said lamp on one side thereof for directing a light beam in a preselected direction, a pair of guide bars mounted in said housing and offset to extend parallel with said light beam, a carriage slidably mounted on said guide rods, an air blower mounted on and movable with said carriage within said housing having an air discharge duct adapted to direct a stream of air around said lamp, an arm on said support, a reflector on said arm arranged on the opposite side of said discharge lamp, and an air deflector plate mounted on said carriage and disposed to one side of the air stream duct of said blower to permit said air stream to be directed to various areas of said gaseous discharge lamp.

2. In a projection lamp, a lamp housing, a high pressure gaseous discharge lamp mounted in said housing providing a light source, a concave reflector mirror mounted in said housing and adjacent said lamp on one side thereof for directing a light beam in a predetermined direction, a guideway mounted in said housing offset from and extending parallel with said light beam, a support slidably mounted on said guideway, an air blower mounted on and movable with said support within said housing having its discharge opening extending in a direction toward said light beam for directing and forcing a stream of cooling air toward said gaseous discharge lamp, an air deflector mounted adjacent said discharge opening on one side thereof for directing the air current over different areas of said discharge lamp, said deflector being mounted on and movable with said support whereby said support can be moved toward and away from said gaseous discharge lamp to an operative cooling position or to an inoperative position to permit access to said gaseous discharge lamp.

3. A projection lamp according to claim 2 characterized in that the air deflector is formed of a heat resistant insulating material.

4. A projection lamp according to claim 2 in which the air deflector is provided with inwardly extending slots for guiding the air stream into at least two different directions to cool various areas of said gaseous discharge lamp.

5. A projection lamp according to claim 4 in which the rear side of the support is provided with an air deflector having a hood portion which opens in the direction toward the blower.

6. A projection lamp according to claim 2 in which an auxiliary reflector is mounted on said support and is arranged on the other side of said lamp in opposed relation to said concave mirror, and said air deflector includes a hood mounted in the rear of said auxiliary reflector opening in the direction of said blower whereby one wall of said hood is formed by the rear face of said auxiliary reflector.

7. A projection lamp according to claim 6 in which the hood is provided adjacent the auxiliary mirror with apertures for directing blasts of air toward the end of the lamp remote from said blower.

References Cited in the file of this patent

UNITED STATES PATENTS

| | | |
|---|---|---|
| 1,743,182 | Ashcraft | Jan. 14, 1930 |
| 1,800,211 | De Vault | Apr. 14, 1931 |
| 2,135,996 | Wood | Nov. 8, 1938 |
| 3,007,370 | McMaster | Nov. 7, 1961 |

FOREIGN PATENTS

| | | |
|---|---|---|
| 1,103,757 | Germany | Mar. 30, 1961 |